United States Patent [19]

Chenaux

[11] 4,438,184

[45] Mar. 20, 1984

[54] SEALED PASSAGE FOR A NEGATIVE TERMINAL THROUGH A METAL WALL, AND ELECTRIC CELL USING SAID SEALED PASSAGE

[75] Inventor: Bernard Chenaux, Poitiers, France

[73] Assignee: Gipelec, Levallois-Perret, France

[21] Appl. No.: 397,436

[22] Filed: Jul. 12, 1982

[30] Foreign Application Priority Data

Jul. 21, 1981 [FR] France .................................. 81 14151

[51] Int. Cl.³ ............................................. H01M 2/06
[52] U.S. Cl. ................................... 429/181; 429/185; 174/50.61
[58] Field of Search ................ 429/181, 185, 48; 361/433; 174/50.61; 403/29

[56] References Cited

U.S. PATENT DOCUMENTS

| 3,275,901 | 9/1966 | Merritt et al. ........................ 361/433 |
| 3,600,017 | 8/1971 | Scherer ................................. 403/29 |
| 3,854,827 | 12/1974 | Merz et al. ............................ 403/29 |
| 4,168,351 | 9/1979 | Taylor .................................... 429/48 |
| 4,233,372 | 11/1980 | Bro et al. ......................... 429/185 X |
| 4,315,974 | 2/1982 | Athearn et al. ..................... 429/181 |
| 4,358,514 | 11/1982 | Garoutte et al. .................... 429/181 |

FOREIGN PATENT DOCUMENTS 2014354 8/1979 United Kingdom .

Primary Examiner—Anthony Skapars
Attorney, Agent, or Firm—Kenyon & Kenyon

[57] ABSTRACT

The sealing between the terminal (1) and the metal wall (2) is provided by a glass seal (3). At least that portion of the terminal which comes into contact with the glass seal is covered with a layer of at least one electrically insulating oxide (4).

6 Claims, 1 Drawing Figure

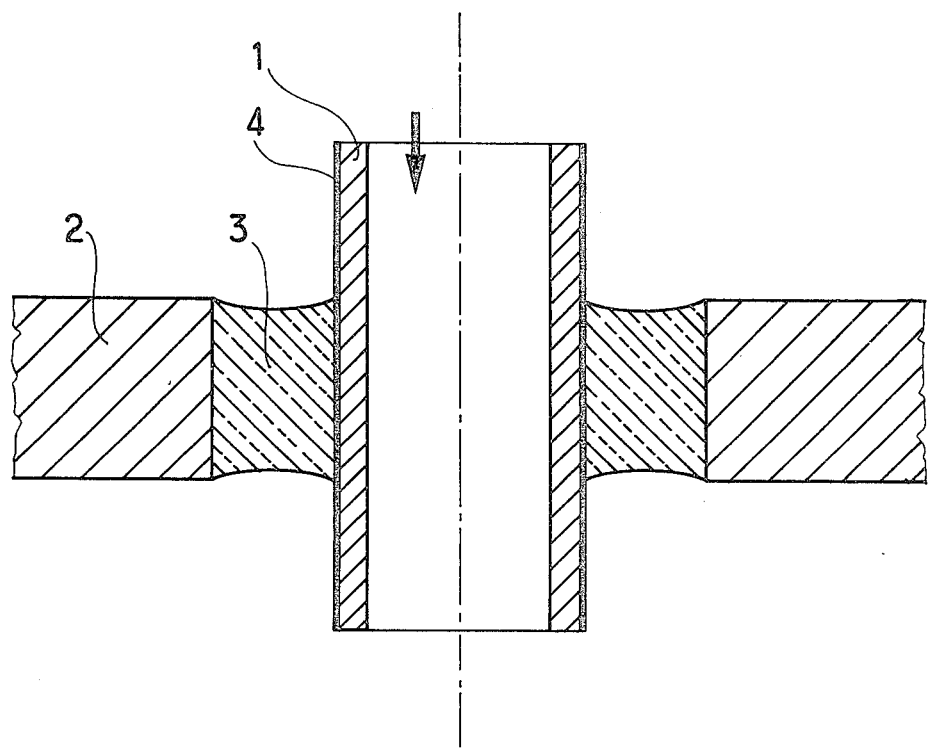

SEALED PASSAGE FOR A NEGATIVE TERMINAL THROUGH A METAL WALL, AND ELECTRIC CELL USING SAID SEALED PASSAGE

BACKGROUND OF THE INVENTION

The present invention relates to a sealed passage for a negative terminal through a metal wall, wherein the sealing between said terminal and the metal wall is provided by a glass seal.

Such passages are to be found in particular in electrochemical cells, and especially in cells having a negative electrode based on lithium. This is because of the highly reactive nature of the electrolytes used which makes it essential to provide a perfectly sealed container for the cell with a seal that performs properly at all the temperatures to which the cell is likely to be exposed.

However, it has been observed in lithium cells, regardless of the positive active material associated with the lithium (copper oxide, silver chromate, thionyl chloride, . . . ) that during discharge the glass of the seal in said passage through the metal wall is degraded.

This degradation takes place according to an electrochemical process which makes use of the oxides that constitute the glass, cations of lithium in solution in the electrolyte, and electrons due to the lithium electrode dissolving.

For $SiO_2$, the principal constituent of glass, the process may be written as follows:

$$SiO_2 + 4Li^+ + 4e^- \rightarrow 2Li_2O + Si$$

it will be understood that this type of reaction can be extended to all the other constitutents of glass, with the reaction rate differing from one constituent to another.

Proposals have already been made to slow down or stop the degradation of the glass by modifying the composition of conventional glasses or by insulating the glass from the electrolyte by a deposit of macromolecular resins or of metallic oxides which are stable under the operating conditions of such a cell.

However these solutions are onerous and not very reliable.

Preferred embodiments of the present invention remedy these drawbacks.

SUMMARY OF THE INVENTION

The present invention provides a sealed passage for a negative terminal through a metal wall, wherein the sealing between said terminal and the metal wall is provided by a glass seal, and wherein at least that portion of the terminal which comes into contact with the glass seal is covered with a layer of at least one electrically insulating oxide.

In the case of a lithium cell for example, the presence of the covering on the negative terminal in accordance with the invention has the effect of slowing down and even of stopping the corrosion reaction by slowing down the arrival of electrons from said terminal connected to the lithium anode. These electrons are essential for the corrosion reaction.

The layer of insulating oxide thus interposed between the negative terminal and the glass seal must naturally be stable under the conditions of normal battery use and must adhere perfectly to the terminal. Preferably its resistivity is high in order to reduce as much as possible the transfer of electrons.

The invention also provides electrochemical cells including such sealed passages for their negative terminals.

By way of example, some usable oxides include oxides of aluminum, niobium, calcium, magnesium, barium, strontium, zirconium, beryllium, titanium, silicon, sodium, potassium or boron. The terminal may be made from at least one of the following metals and alloys: stainless steel, iron-nickel alloys, iron-chrome alloys, titanium, tantalum, and alloys thereof.

BRIEF DESCRIPTION OF THE DRAWING

An embodiment of the invention is described with reference to the accompanying drawing which is a cross-section through one embodiment of a sealed passage for a negative terminal through a metal wall in a lithium cell.

MORE DETAILED DESCRIPTION

The negative terminal of the cell is constituted by a tubular metal peg 1 which passes through a metal cup 2 that is connected to the positive polarity of the cell.

The peg 1 is insulated from the wall of the cup 2 by a glass sealing ring 3.

In accordance with the invention the outside face of the peg 1 is covered with a layer 4 of insulating oxide. The layer may be between a few microns thick and a few tenths of a millimeter thick.

The peg 1 may be made of stainless steel, of an alloy of iron and nickel or of iron and chrome, of titanium or of tantalum, for example.

The layer of insulating oxide may be based on alumina, and deposited on the peg by projection from a plasma torch.

The layer thus deposited may be processed to reduce its porosity. Thus, an alumina layer may be sintered at a temperature lying in the range 1500° C. to 1800° C. Naturally, in this case, the material from which the peg is made must be capable of standing up to such processing; tantalum is useful for this purpose.

Alternatively, a titanium peg could be used and it could be covered with an insulating layer of titanium oxide using an anodic oxidation process.

Once the peg has been covered with its layer of insulating oxide, the sealed passage is made in the conventional compressed seal manner, i.e. the members assembled around the passage (a cup, the glass ring, the central peg and its layer of insulation) are raised to a high temperature to melt the glass. On cooling, the layer of insulating oxide is imprisoned between the central peg and the glass, thereby preventing electrons from being transferred from the lithium electrode into the glass.

A comparison has been performed between cells provided with a sealed passage including a layer of insulating oxide, and identical cells except that there was no layer of insulating oxide. The cells were lithium/silver chromate cells using an electrolyte comprising a solution of lithium pechlorate in propylene carbonate.

After two months, total destruction of the glass in cells which did not have a layer of insulating oxide was observed, while in the cells which did have such a layer in accordance with the invention, the glass was intact and the passage remained completely sealed.

Naturally the invention is not limited to the embodiment described and shown, which has been given merely by way of example. If, for some reason, the polarity of the electrodes is swapped over, the protective layer should be deposited between the glass 3 and the surrounding metal cup 2. In other words it is always the metal part connected to the lithium anode which must be covered with the protective deposit of oxide.

I claim:

1. A sealed passage for a negative terminal through a metal wall, wherein the sealing between said terminal and the metal wall is provided by a glass seal, and wherein at least that portion of the terminal which comes into contact with the glass seal is covered with a layer of at least one electrically insulating oxide.

2. A sealed passage according to claim 1, wherein said layer has a thickness lying between a few microns and a few tenths of a millimeter.

3. A sealed passage according to claim 1, wherein said terminal is made from a metal chosen from the group constituted by stainless steel, iron-nickel alloys, iron-chrome alloys, titanium, tantalum, and alloys thereof.

4. A sealed passage according to claim 1, wherein said insulating oxide is chosen from the group constituted by the oxides of aluminum, niobium, calcium, magnesium, barium, strontium, zirconium, beryllium, titanium, silicon, sodium, potassium, and boron.

5. A sealed passage according to claim 1, wherein said insulating oxide is chosen from the group constituted by the oxides of aluminum, niobium, calcium, magnesium, barium, strontium, zirconium, beryllium, and titanium.

6. An electrochemical cell including a lithium based negative electrode, a positive electrode, and an electrolytic medium in a container having a metal wall, the container being electrically connected to one of said electrodes and the metal wall forming one terminal of the cell, a metal member connected to the other electrode and forming a second terminal of the cell, and a sealed passage for the metal member through the metal wall, wherein the sealing between said metal member and the metal wall is provided by a glass seal, and wherein at least that portion of the terminal connected to the negative electrode which comes into contact with the glass seal is covered with a layer of at least one electrically insulating oxide, said electrically insulating oxide being chemically stable in the electrolytic medium of said cell.

* * * * *